Figure 1:
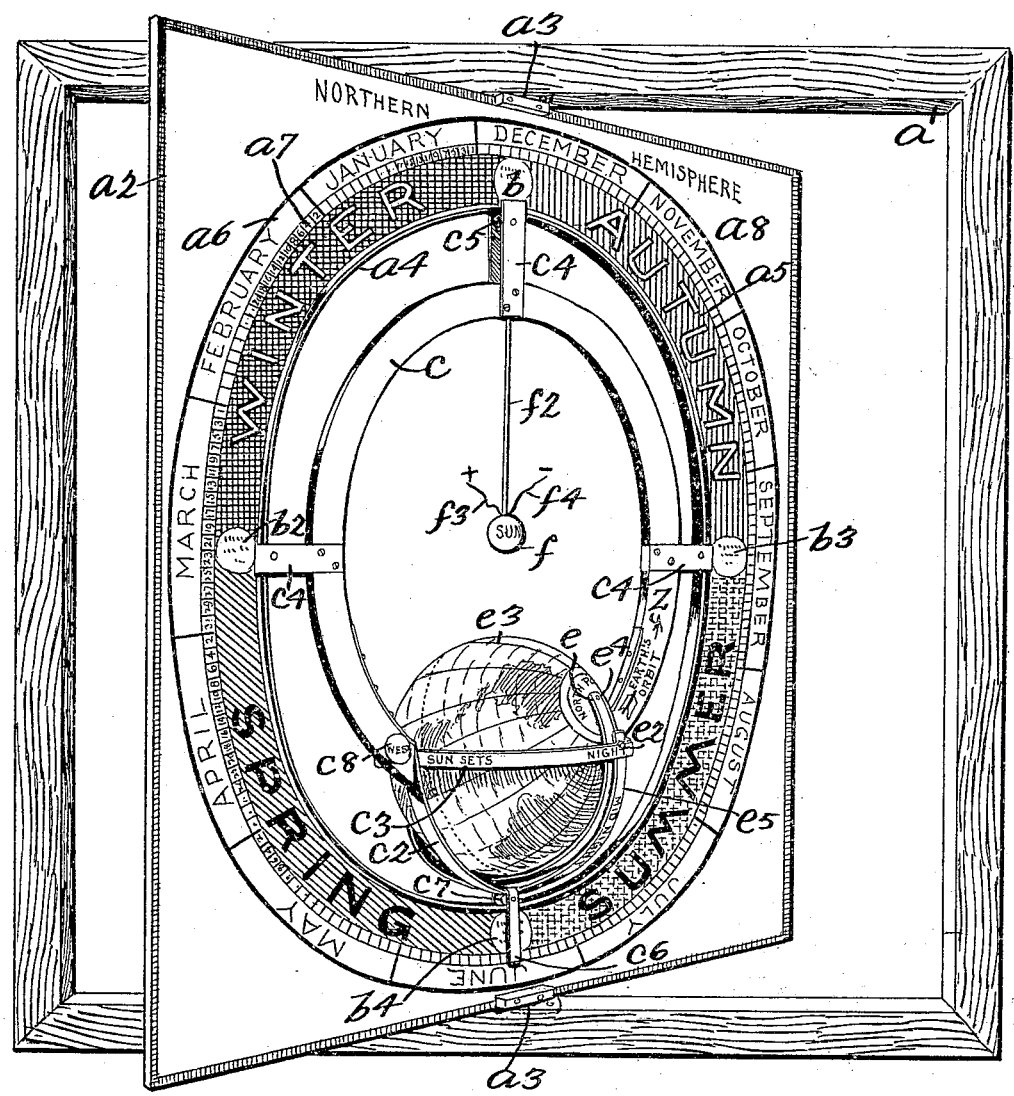

L. BARRITT.
EDUCATIONAL APPARATUS.
APPLICATION FILED JULY 16, 1908.

959,987.

Patented May 31, 1910.

4 SHEETS—SHEET 1.

Witnesses:
Chas. E. Robinson
John Keeber

Inventor
Leon Barritt
By Attorney
J. Chris Larsen

L. BARRITT.
EDUCATIONAL APPARATUS.
APPLICATION FILED JULY 16, 1908.

959,987.

Patented May 31, 1910.
4 SHEETS—SHEET 2.

L. BARRITT.
EDUCATIONAL APPARATUS.
APPLICATION FILED JULY 16, 1908.

959,987.

Patented May 31, 1910.
4 SHEETS—SHEET 3.

Witnesses:
Chas. E. Robinson
John Reiber

Inventor
Leon Barritt
By Attorney
J. Chris Larsen

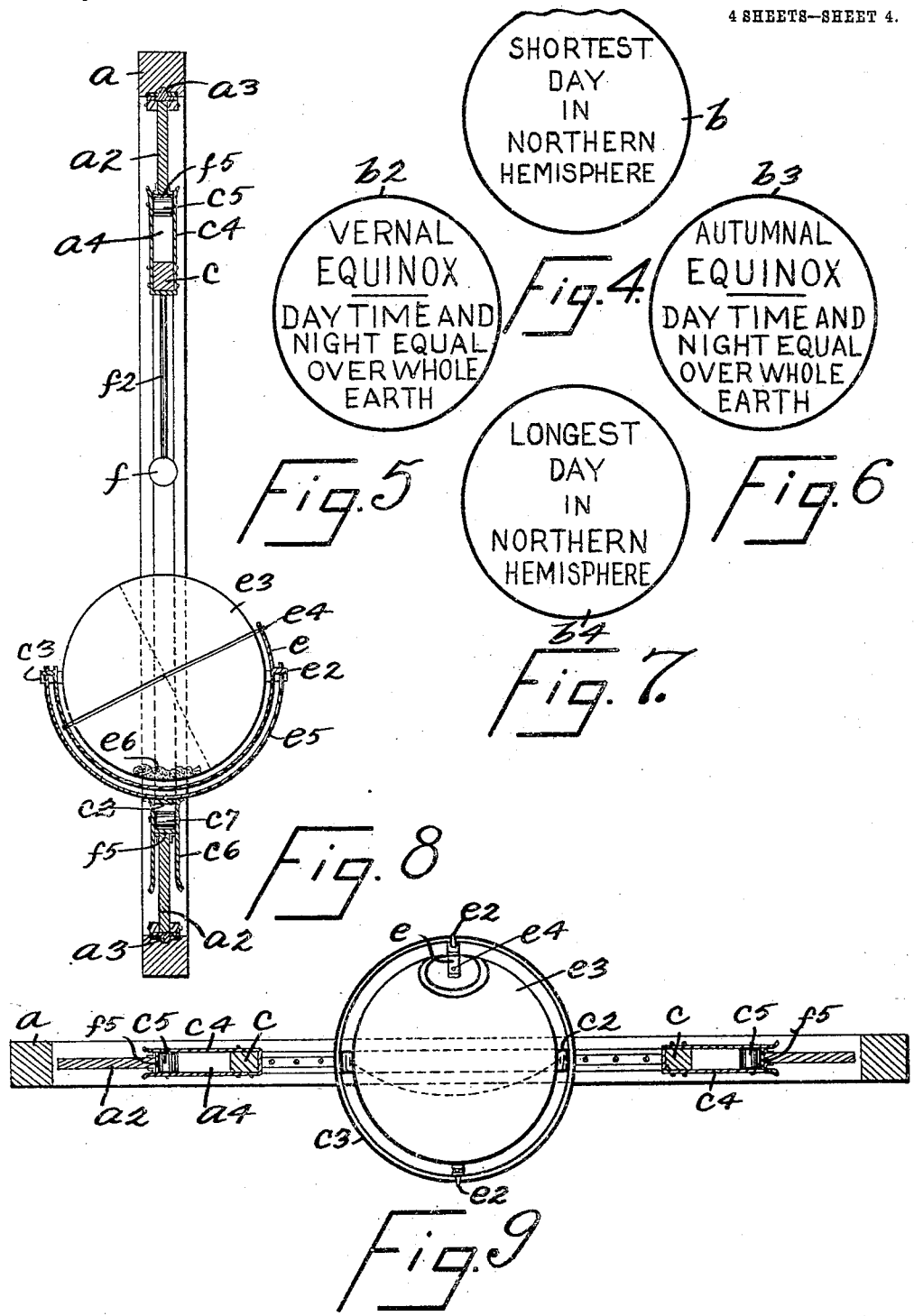

UNITED STATES PATENT OFFICE.

LEON BARRITT, OF BROOKLYN, NEW YORK.

EDUCATIONAL APPARATUS.

959,987.  Specification of Letters Patent.  Patented May 31, 1910.

Application filed July 16, 1908. Serial No. 443,870.

*To all whom it may concern:*

Be it known that I, LEON BARRITT, a citizen of the United States of America, and residing at Brooklyn, in the county of Kings and State of New York, have invented certain new and useful Improvements in Educational Apparatus, of which the following is a specification, such as will enable those skilled in the art to which it appertains to make and use the same.

This invention relates to educational apparatus and the object thereof is to provide a device whereby the changes of season on the earth's surface may be clearly shown so that even the youngest children may readily understand the same, this having been heretofore an involved subject and the explanation thereof generally vague; a further object being to graphically portray the said changes in both hemispheres and at any date of the year; a further object being to clearly show the reasons for day and night upon the earth and why, when it is day at one point of the earth's surface, it is night at another; a further object being to clearly portray the two movements of the earth, viz:—the orbital or annual, about the sun and the axial or daily, upon its axis and also to show when the longest and shortest days of the year occur at any point on the earth's surface; a further object being to show the earth's inclination at any time of year and at any point on the surface of the earth; a still further object being to not alone show the above results but also to clearly set forth the reasons therefor; and a still further object being to provide such a device which is simple in construction and use, well adapted for the purpose for which it is intended, which cannot readily get out of order and which is comparatively inexpensive.

My invention is fully set forth in the following specification, of which the accompanying drawings form a part, in which the separate parts are designated by the same reference characters in each of the views, and in which:—

Figure 2:
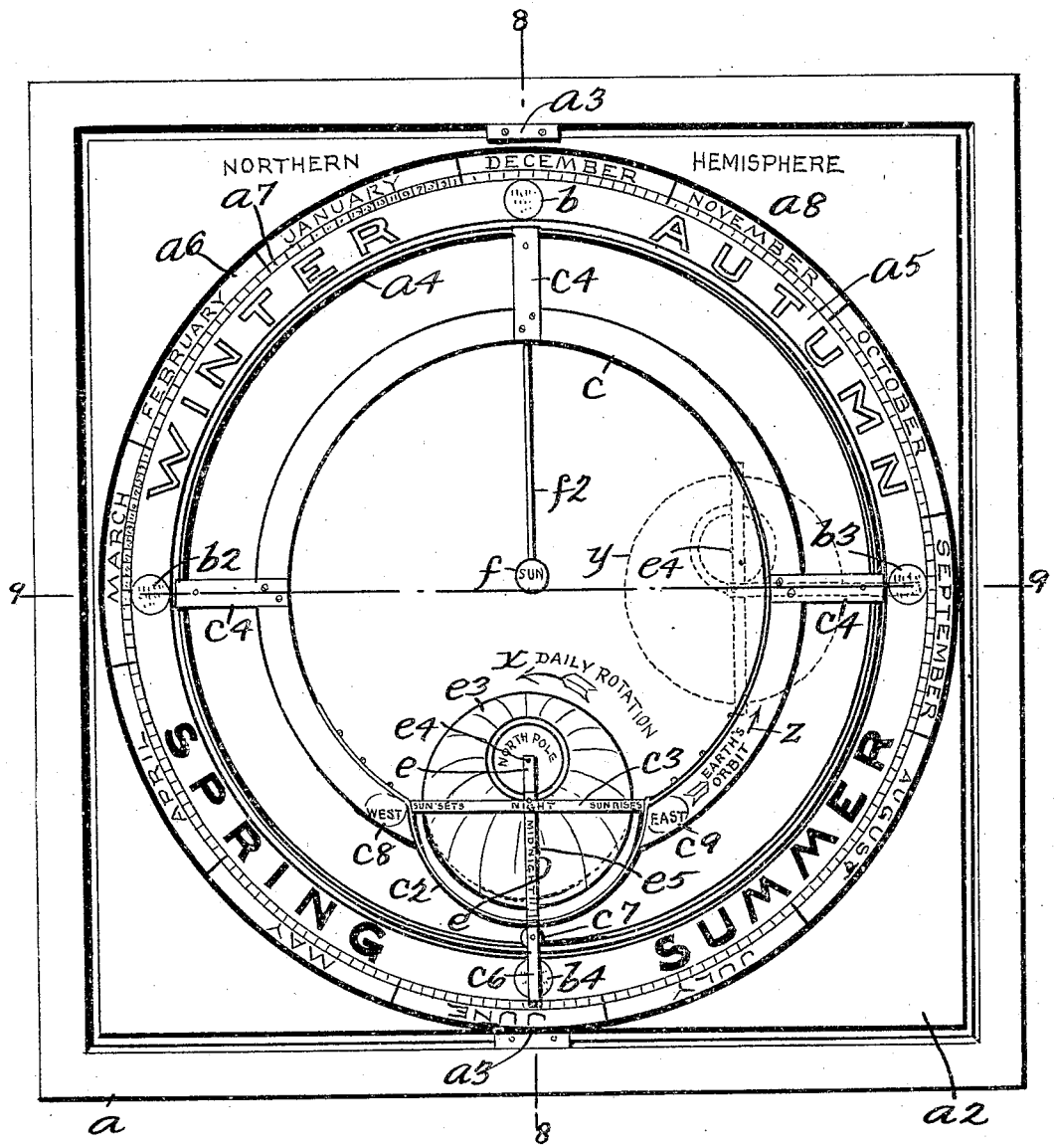
Figure 3:
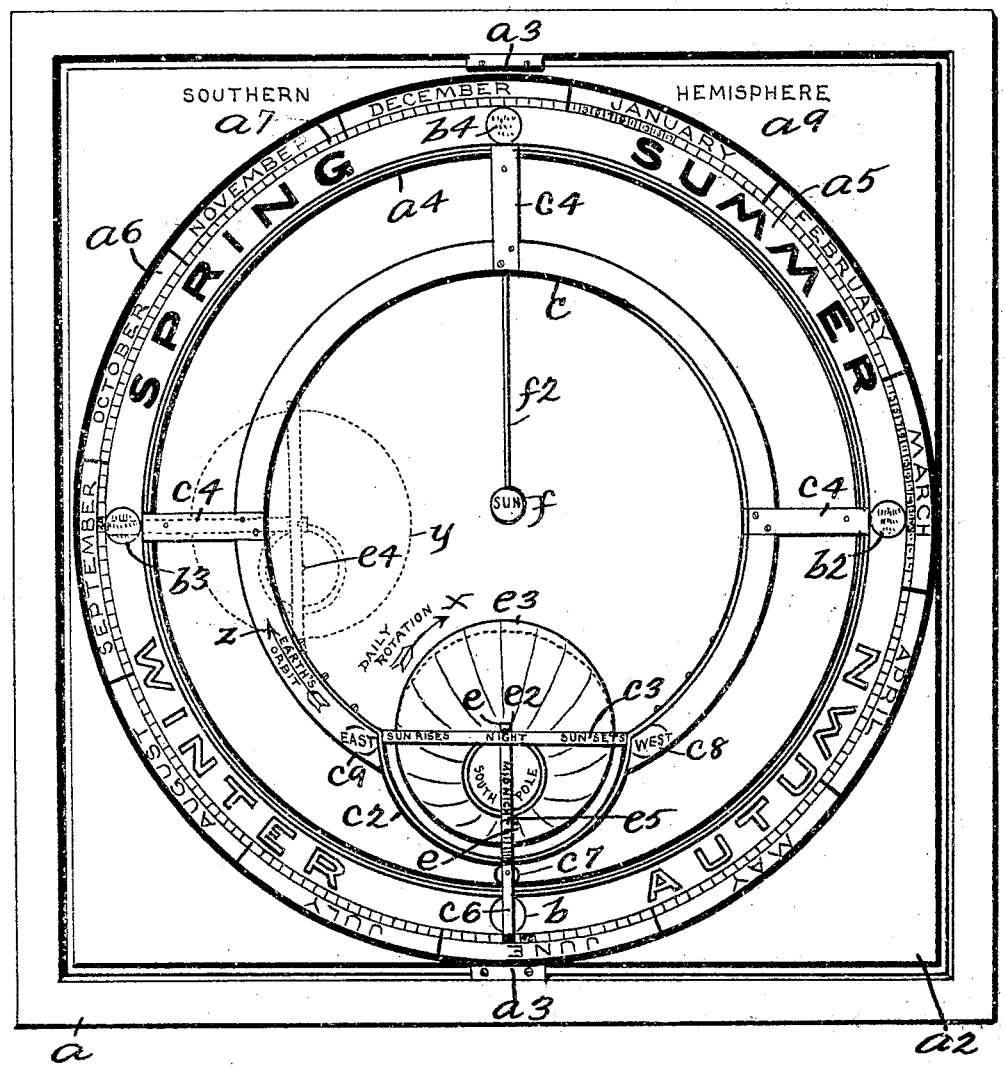

Figure 1 is a perspective view of my invention with the parts in one position. Fig. 2 is an elevation of the northern hemisphere, with a different position of the parts indicated; Fig. 3 is a view, similar to Fig. 2, but showing the reverse side and the southern hemisphere; Figs. 4, 5, 6 and 7 are enlarged views of certain printed disks which I employ; Fig. 8 is a section on the line 8—8 of Fig. 2; and Fig. 9 is a section on the line 9—9 of Fig. 2.

In the drawings forming a part of this application, I have shown a frame $a$, preferably square, within which is a plate or support $a^2$ pivoted centrally thereof, as shown at $a^3$, to the said frame, and provided with a circular opening $a^4$, adjacent to which are three circles $a^5$, $a^6$ and $a^7$ upon which are printed the four seasons, the months of the year and the days of the month, respectively, upon both sides of the support $a^2$ but with this difference, that the seasons are reversed in position upon the reverse side and the months, as well as the days thereof, read in a reversed position or direction, these two sides being designated by the reference character $a^8$ for the northern hemisphere on one side and $a^9$ for the southern hemisphere on the other side.

Adjacent the pivots $a^3$, between the season names which they separate, are disks $b$ and $b^4$ and at right angles thereto are disks $b^2$ and $b^3$, all of which are shown in Figs 4, 7, 5 and 6, respectively, and with printed matter thereon indicating the shortest and longest days, the vernal equinox and the autumnal equinox, these disks being also reversed on the opposite sides of the support $a^2$.

Within the opening $a^4$ is a segment, preferably of metal, $c$, having the ends thereof joined by a segment $c^2$ in a vertical plane and a ring $c^3$ in a horizontal plane, and secured to the segment $c$, preferably in line with and at right angles to the axis of the segment $c$, are yokes $c^4$ which carry each a roller $c^5$ bearing against the circular edge of the support $a^2$ and movable thereon, whereby the said segment $c$ may be rotated, and, adjacent the ends of the segment $c$ is a yoke $c^6$, serving also as a pointer on the rings or circles $a^5$, $a^6$ and $a^7$, having a roller $c^7$ and it will be seen that the segment $c$ is thus freely rotatable but guided in such movement, and, adjacent the segment $c^2$, on the segment $c$, are two disks $c^8$ and $c^9$ and which represent a westerly or easterly direction, while upon the ring $c^3$, adjacent the segment $c$, is printed "Sun rises" and "Sun sets," between which is printed the word "Night."

Secured to the segment $c^2$ and ring $c^3$ is a segment $e^5$ arranged at right angles, in a vertical plane, to the segment $c^2$ and having "Midnight" printed thereon and, at the ends thereof, is pivotally mounted a segment $e$ one end of which projects above its pivotal point $e^2$ and in which is rotatably mounted a globe $e^3$ representing the earth upon its axis $e^4$ and within which is placed shot or other weight in order to maintain the globe in a desired position, as shown at $e^6$, and it will be seen that the globe $e^3$ may rotate on its axis, may swing on its pivot $e^2$ or may be rotated with the segment $c$.

Arranged approximately centrally of the opening $a^4$ is a sphere $f$, representing the sun, upon a rod $f^2$ and, if desired the said sphere may be replaced by an electric light having the wires $f^3$ and $f^4$ thereof connected with a source of electrical supply, and, in practice, I prefer to edge the opening $a^4$ with a metal strip $f^5$ shown in Fig. 8 in order to insure durability and true movement.

In Fig. 1, I have shown the season divisions in the circle $a^5$ of different colors as, for instance, green for spring, yellow for summer, red for autumn and black for winter, thus producing a striking and easily distinguishable division of the seasons, or the plain colors may be replaced by typical designs as may also the months and the days thereof, the object being to clearly differentiate between the several divisions and to thus more strongly impress the same upon the mind of a child, making a mental picture rather than a tax on the memory, and it will be understood that the globe $e^3$ is similar to those usually employed in schools and having the map of the world thereon as well as the zones, divisional circles, and lines of latitude and longitude.

The axial rotation of the globe $e^3$ is indicated by the arrow $x$, and the orbital movement is indicated by the arrow $z$, whereby the pointer $c^6$ is caused to follow the months in regular succession but the direction of the movements is reversed, as will be understood, when the southern hemisphere is turned to the front upon the pivots $a^3$ and it is for this reason that the months and days thereof read reversely, on this side, from that of the northern hemisphere, and, while the orbital movement is really elliptical, the slight difference of diameters, 59 to 60, would not be appreciable over a circle on the scale shown and therefore I make the same a circle.

The earth always maintains its exact relationship with the sun and the north star, or nearly so, and the axis $e^4$ is therefore at an inclination of approximately 23 degrees and this angle is maintained because of the swinging segment $e$ and of the weight $e^6$, the latter also serving to hold the globe $e^3$ in any desired position, against free rotation.

By moving the pointer $c^6$, manually, in the direction of the arrow $z$, the globe $e^3$ is correspondingly moved in its orbit and, while in the position shown in full lines the rays of the sun, in an axial plane, meet the earth between the north pole and the equator, the said plane gradually moves toward the said equator until it meets the same when the earth is in the position indicated in dotted lines and then passes the same and moves away therefrom and between the equator and the south pole until the extreme position, directly opposite that shown in full lines, is reached after which continued rotation of the earth on its orbit returns it to its original relationship with the sun and, in this movement, the rays of the sun have first covered the northern hemisphere and the arctic circle, then gradually passed southward until the southern hemisphere and the antarctic circle is covered and then back to initial position, thereby the seasons, because of the difference of direct heat from the sun, are produced.

When the earth is in the position shown in full lines, and the sun's rays covering the arctic circle, constant daylight results over this region, for a period of approximately six months and when the earth is in the opposite position, the region within the antarctic circle is enjoying constant daylight, for the same reason, and constant night results in the arctic region, and, as that portion of the earth's surface beneath the ring $c^3$ is in darkness, the longest and shortest days are easily found for each hemisphere and, when the pointer $c^6$ is moved to any day of the year, the length of the day in any latitude is readily found by counting the longitudinal lines outside of the ring $c^3$, it being understood that 24 of these lines are employed, as is usual, and equivalent to the 24 hours of the day.

By the rotation of the globe $e^3$ in its orbit, therefore to any month or day thereof, the season for each of the hemispheres is clearly shown on the corresponding side of the plate $a^2$ and the reason for the change of season is made perfectly clear to a child, and, when the globe $e^3$ is rotated on its axis, upon any day of the year, that part of the earth having daylight and that having night is clearly shown, as well as the reasons therefor, and the length of the day, in any latitude, may be readily found by even the youngest student.

When an electric lamp is substituted for the sphere $f$, the result is very realistic and that part of the globe $e^3$ within the ring $c^3$ is in positive shadow and the light is diffused upon the surface of the globe contiguous to the ring $c^3$, explaining dusk or twilight and the reason for practically no twilight near the equator.

It will be seen that my invention is very simple, both in construction and use, and I reserve the right to use such modifications as may suggest themselves, within the scope of my invention and the spirit thereof and, with such reservation, what I claim as new and desire to secure by Letters Patent, is:—

1. An educational device, comprising a support having the divisions of a year marked in relatively reversed order on each of two sides, a sphere representing the sun carried by said support, and a globe representing the earth rotatably carried by the support and revoluble about the sun.

2. An educational device, comprising a support having the divisions of a year marked in relatively reversed order on each of two sides, a sphere representing the sun carried by said support, a globe representing the earth rotatably carried by the support and revoluble about the sun and an indicator movable over said divisions, on each side of said support, with the earth in revolution about the sun.

3. An educational device, comprising a support having the divisions of a year on one side thereof for the northern hemisphere and the complemental divisions of a year in the southern hemisphere on the opposite side thereof, a sphere representing the sun carried by the support, a globe representing the earth rotatably carried by the support and revoluble about the sun, and a pointer for simultaneously indicating complemental yearly divisions in both hemispheres.

4. An educational device, comprising a support having the divisions of a year marked in relatively reversed order on each of two sides, a sphere representing the sun, a segment revoluble in said support about said sun and a globe representing the earth carried by the ends of said segment and independently rotatable.

5. An educational device, comprising a support having the divisions of a year marked in relatively reversed order on each of two sides, a segment revoluble in said support, a sphere representing the sun carried by said segment, a supplemental segment held between the ends of said segment and at right angles to said support, a globe segment pivoted to said supplemental segment, and a globe representing the earth rotatably held in said globe segment in an inclined position.

6. An educational device, comprising a support having the divisions of a year marked in relatively reversed order on each of two sides, a sphere representing the sun carried by said support, a globe representing the earth rotatably carried by the support and revoluble about the sun, means for indicating complemental yearly divisions, for the northern and southern hemispheres, on opposite sides of said support, and a ring about said globe for determining the length of a day at any point on the surface thereof exposed to said sphere.

7. An educational device, comprising a support having complemental divisions of a year marked on each of two sides, a sphere representing the sun in fixed position, and a rotatably mounted globe representing the earth revoluble about the sun and with relation to said yearly divisional markings, whereby complemental yearly divisions are determined for both northern and southern hemispheres at any point of the revolution of said earth about said sun.

8. An educational device, comprising a support having complemental divisions of a year, for the northern or southern hemispheres, marked on each of two sides, a sphere representing the sun in fixed position, a globe representing the earth rotatably carried by said support, in a constantly maintained inclined position, and revoluble about said sun and with relation to said yearly divisional markings, whereby complemental yearly divisions are determined for both the northern and southern hemispheres at any point of the revolution of the earth about the sun, and a ring for determining the length of exposure of any portion of the earth to the sun, in the position of any of said yearly divisional markings.

In testimony that I claim the foregoing as my invention I have signed my name in presence of the subscribing witnesses this 15th day of July 1908.

LEON BARRITT.

Witnesses:
CHAS. E. ROBINSON,
JOHN REEBER.